United States Patent [19]
Kato et al.

[11] Patent Number: 5,747,929
[45] Date of Patent: May 5, 1998

[54] ELECTROLUMINESCENCE ELEMENT AND METHOD FOR FABRICATING SAME

[75] Inventors: Akira Kato, Kariya; Masayuki Katayama, Handa; Nobuei Ito, Chiryu; Tadashi Hattori, Okazaki, all of Japan

[73] Assignee: Nippondenso Co., Ltd., Kariya, Japan

[21] Appl. No.: 523,938

[22] Filed: Sep. 6, 1995

[30] Foreign Application Priority Data

Sep. 7, 1994  [JP]  Japan .................... 6-213978
May 18, 1995  [JP]  Japan .................... 7-119805

[51] Int. Cl.$^6$ ..................................... H01J 1/63
[52] U.S. Cl. ............................... 313/503; 313/506
[58] Field of Search ............................ 313/503, 506, 313/509, 512; 252/301.45

[56] References Cited

U.S. PATENT DOCUMENTS

5,309,070  5/1994  Sun et al. ........................ 313/503
5,612,592  3/1997  Katayama ........................ 313/503

FOREIGN PATENT DOCUMENTS

272592  3/1990  Japan.

OTHER PUBLICATIONS

Benalloul et al, "IIA–III$_2$–S$_4$ ternary compounds: New host matrices for full color thin film electrolumines cence displays", Appln. Phys. Lett., 63(14), 4 Oct. 1993: pp. 1954–1956.

Barrow et al, "A high Contrast, Full Color, 320.256 Line TFEL Display", 1994 International display Research conference, 10–13 Oct. 1994: pp. 448–451.

Barrow et al, "A New Class of Blue TFEL Phosphors with Application to a VGA Full-Color display", SID 93 Digest, 1993: pp. 761–764.

*Primary Examiner*—Nimeshkumar Patel
*Attorney, Agent, or Firm*—Cushman Darby & Cushman IP Group of Pillsbury Madison & Sutro, LLP

[57] ABSTRACT

A thin-film electroluminescence element is formed by laminating, in order, on a glass substrate which is an insulating substrate, a first transparent electrode including optically transparent ZnO, a first insulating layer including optically transparent strontium titanate, a luminescent layer including CaGa$_{2.9}$S$_{4.2}$ to which Ce is added as a luminescent center, a second insulating layer including optically transparent strontium titanate and a second transparent electrode including optically transparent ZnO. The optical spectrum of the luminescent layer deviates towards a short wavelength side due to the crystal structure changing and the ligand field surrounding the Ce changing slightly due to the existence of excess Ga in the luminescent layer. Also, because calcium thiogallate is used, high light intensity can be maintained.

17 Claims, 11 Drawing Sheets

ELECTROLUMINESCENCE ELEMENT AND METHOD FOR FABRICATING SAME

CROSS REFERENCE TO RELATED APPLICATION

This application is based upon and claims the benefit of priority of the prior Japanese Patent applications No. 6-213978 filed on Sep. 7, 1994 and No. 7-119805 filed on May 18, 1995, the contents of which are incorporated herein by reference.

BACKGROUND OF THE INVENTION

1. Field of the Invention

The present invention relates to luminescent layer of an electroluminescence element (hereafter referred to as an EL element) used in instruments of, for example, emissive type segment displays and matrix displays, or in various displays of information terminals.

2. Related Arts

EL elements use the phenomenon that light is emitted when an electric field is applied to a fluorescent body such as ZnS (zinc sulphide) and have drawn attention as elements for forming emissive type flat displays.

FIG. 12 is an exemplary diagram showing a typical cross-sectional structure of a conventional EL element 100. The EL element 100 is formed by laminating, in order, a glass substrate 101 which is an insulative substrate, a first electrode 102 comprising an optically transparent ITO film, a first insulating layer 103 comprising $Ta_2O_5$ (tantalum pentoxide) etc., a luminescent layer 104, a second insulating layer 105 comprising $Ta_2O_5$ etc., and a second electrode 106 comprising an ITO film. The ITO (indium tin oxide) film is a conductive film in which Sn is doped in $In_2O_3$ (indium oxide) and is widely used in the art for transparent electrodes because it has low resistance.

As the luminescent layer 104, for example, ZnS as the host material, to which Tb (terbium), Sm (samarium) or Tm (thulium) is added as the luminescent center, or SrS (strontium sulphide) as the host material, to which Ce (cerium) is added as the luminescent center, are used. Among these, as a material for the luminescent layer 104 which is capable of attaining blue light emission, ZnS doped with Tm, SrS doped with Ce and the like have been under investigation.

However, when ZnS doped with Tm is used as the luminescent layer, sufficient brightness cannot be attained because of low light emission intensity (luminance) thereof. On the other hand, when SrS to which Ce is added is used as the luminescent layer, because the light emission color is blue-green, a filter must be used to cut a portion of the light whose wavelength is 500 nm or higher to attain blue light. However, although the original light emission intensity is relatively high, blue light emission intensity attained in this way drops to as little as about 10% of the original light emission intensity. Also, due to the necessity of a filter as a structural element such disadvantages as the structure of the display becoming complicated and the cost thereof increasing are incurred.

In order to solve this problem, application of a $CaGa_2S_4$:Ce (calcium thiogallate doped with cerium) phosphor as a blue light emission layer whose light emission intensity is high and which does not require a filter has been reported (see Barrow et al., "A New Class of Blue TFEL Phosphors with Application to a VGA Full-Color Display", SID 93 DIGEST (1993), pp. 761–764 and Japanese Unexamined Patent Publication No. H5-65478).

However, the CIE (Commission Internationale de l'Eclairage) color coordinates for EL elements using a $CaGa_2S_4$:Ce luminescent layer is (x, y)=(0.15, 0.19). On the other hand, the CIE color coordinates (x, y) for ZnS:Ag used as a blue phosphor for cathode ray tubes is on the order of (0.15, 0.07). From this, it can be said that the blue purity of a $CaGa_2S_4$:Ce luminescent layer as a blue EL light-emitting layer is as yet insufficient and has not been a satisfactory element.

SUMMARY OF THE INVENTION

The present invention, in the light of the above problems, has as its object to provide a high-intensity EL element with improved blue purity.

In order to solve the above problems, a luminescent layer of an EL element according to the present invention is formed by adding Ce as the luminescent center to $CaGa_xS_y$ (where $2.1 \leq x \leq 3.5$ and $y \geq 4$). In other words, the characteristic thereof is that the atomic number ratio of Ga to Ca is higher than in the $CaGa_2S_4$ of the conventional luminescent layer.

The inventors have found that an EL luminescent layer ($CaGa_xS_y$:Ce [where $2.1 \leq \leq x3.5$ and $y \geq 4$]) has an electroluminescence spectrum which shifts to a shorter wavelength and as a result blue color purity thereof becomes higher than that of the conventional $CaGa_2S_4$:Ce.

Furthermore, $CaGa_xS_y$:Ce (where $2.1 \leq x \leq 3.5$ and $y \geq 4$) can form an EL element of a high light-emitting intensity. That is to say, the luminescent layer according to the present invention is compatible with both high blue color purity and high light intensity.

On the other hand, a fabrication method of an EL element of the present invention includes laminating a first electrode, a first insulating layer, a luminescent layer, a second insulating layer and a second electrode on a substrate in that order, wherein the luminescent layer is deposited by means of sputtering method using a sputtering gas of Ar or the like in which hydrogen sulphide of between 5 mol % and 50 mol % is included and a target which has been fired after mixing $CaGa_2S_4$ doped with Ce and a Ga compound.

By employing such a fabrication method, an EL element having a luminescent layer whose Ga/Ca ratio is from 2.1 to 3.5 can be fabricated.

As described above, according to the present invention, it is possible to provide an EL element with high intensity and good blue color purity, which will have a great effect on the full color development of EL display devices.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

Figure 1:
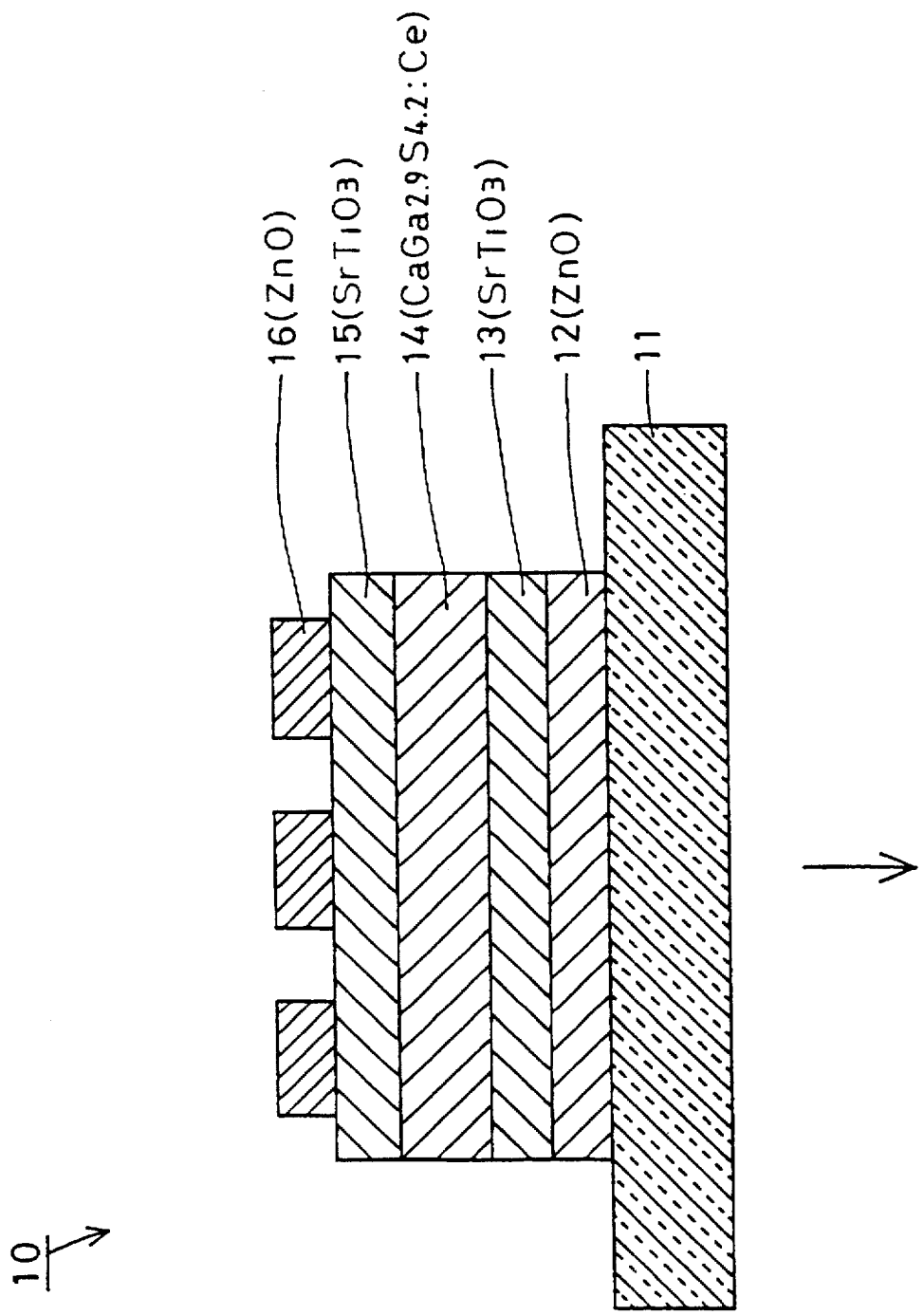
FIG. 1 is an exemplary diagram showing a vertical cross section of an EL element according to a first embodiment.

The luminescent layer of the EL element according to the present invention is, as described above, formed by adding Ce as the luminescent center to $CaGa_xS_y$ (where $2.1 \leq x \leq 3.5$ and $y \geq 4$). In other words, the characteristic thereof is that the atomic number ratio of Ga to Ca is higher than in the $CaGa_2S_4$ of the conventional luminescent layer. Note that $2.4 \leq x \leq 3.1$ is more preferable.

According to this EL luminescent layer ($CaGa_xS_y$:Ce [where $2.1 \leq x \leq 3.5$ and $y \geq 4$]), the electroluminescence spectrum shifts to a shorter wavelength and as a result its blue color purity is higher than that of the conventional $CaGa_2S_4$:Ce. Note that, according to the SID 93 DIGEST (pp. 761–764), with respect to blue color purity, $SrGa_2S_4$:Ce and $BaGa_2S_4$:Ce exhibit higher purity. The EL luminescent layer of the present invention, in terms of blue color purity, is closer to these materials than $CaGa_2S_4$:Ce and, in particular, has substantially the same blue color purity as that of $BaGa_2S_4$:Ce (CIE color coordinates of x=0.15, y=0.15).

On the other hand, $CaGa_xS_y$:Ce (where $2.1 \leq x \leq 3.5$ and $y \geq 4$) can form an EL element of higher light-emitting intensity than $SrGa_2S_4$:Ce and $BaGa_2S_4$:Ce, and is excellent in this respect. In other words, the EL luminescent layer of the present invention is compatible with both high blue color purity and high light intensity and, as a result, has good balance when combined with already realized red and green luminescent layers of high color purity and high intensity and will henceforth contribute greatly to realizing full-color EL display apparatus.

In this manner, the present invention is effective in providing an EL element with good blue color purity.

Although the reason why the blue color purity becomes higher is not clear, it is presumably because, if Ga exists in excess in the luminescent layer, the crystal structure changes and the ligand field surrounding the Ce, which is the luminescent center, changes slightly.

Note that the amount of the content of sulfur (S) depends normally on composition ratio x and that composition ratio y increases in accordance with an increase in composition ratio x. In the case of $2.1 \leq x \leq 3.5$, y=4.0 to 6.0. However, the value of y does not affect the light emission spectrum of the luminescent layer and consequently does not affect blue color purity. There are, however, cases where a film capable of emitting light cannot be obtained when y is less than 4.0.

Incidentally, obtaining blue color from an EL luminescent layer formed by adding Ce to a material having a composition of $(MS)_x \cdot Ga_2S_3$ (where $0.7 \leq x \leq 1.5$ and M=Ca, Sr or Ba) is disclosed in Japanese Unexamined Patent Publication No. H2-72592. If x and M are chosen as x=0.8 and M=Ca, the composition formula would be $CaGa_{2.5}S_{4.75}$ and enter the composition range of the EL luminescent layer of the present invention. However, in terms of the two points to be described below, the present invention provides a completely novel technique with respect to the above publication.

Firstly, in the above patent publication, only an embodiment in which M=Sr or Ba is disclosed and there is no description whatsoever of Ca. Consequently, the necessity of making x=2.1 to 3.5 and $y \geq 4$ in $CaGa_xS_y$:Ce is not described.

Secondly, according to the embodiment relating to $(SrS)_x \cdot Ga_2S_3$, it is understood that this exhibits the greatest light intensity characteristic when x is approximately 1.0 and that light intensity decreases significantly in the regions where x is below 0.7 and above 1.5. Then, assuming a case where Ca is substituted for (Sr), when x is approximately 1.0, i.e., $CaGa_2S_4$:Ce, maximum luminance would be obtained, and when $x \geq 2.0$ in $CaGa_xS_y$:Ce, the luminance would decrease. In contrast with this suggestion of a reduction in intensity where $x \geq 2.0$ in $CaGa_xS_y$:Ce, no discernible reduction could be seen in intensity in the range of $2.1 \leq x \leq 3.5$, and in particular $2.4 \leq x \leq 3.1$ according to experiments performed by the inventors of the present invention. In addition, the present invention has been completed by clarifying that blue color purity increases within this range. In other words, for the first time, the present invention clarifies composition conditions for achieving high blue color purity and high light intensity in $CaGa_xS_y$:Ce. Also, changes in color coordinates is a phenomenon peculiar to Ca, and the present invention for the first time recognizes that the light emission spectrum changes when $x \geq 2.1$ in $CaGa_xS_y$:Ce and shows that this is effective in improving the characteristic of $CaGa_2S_4$:Ce, whose blue color purity is unsatisfactory.

The above description means that the present invention has an effect of a different nature to and which cannot be predicted from the contents of the above patent publication. Also, obtaining high light emission intensity by way of $CaGa_2S_4$:Ce does not of itself go beyond the facts of conventional knowledge. Ultimately, the above publication does not suggest at what range of x and y in $CaGa_xS_y$:Ce high blue color purity can be achieved while maintaining high intensity.

Also, the luminescent layer of the EL element of the present invention is an EL light-emitting layer in which $CaGa_xS_y$ is doped with Ce as the luminescent center and which has a characteristic wherein, when Cu (copper) Kα characteristic X-ray is used as the X-ray source, the X-ray diffraction spectrum has a peak at at least one of 16.9°±0.20°, 18.5°±0.20° and 19.7°±0.20°. This type of X-ray diffraction spectrum peak differs from that of $CaGa_2S_4$. Specifically, compared to the $CaGa_2S_4$ X-ray diffraction peak data described in the JCPDS (Joint Committee on Powder Diffraction Standards) Card No. 25-0134, which has its main peak at 17.6°, a clear difference in the X-ray diffraction spectrum can be recognized. The inventors of the present invention investigated EL luminescent layers whose Ga/Ca ratios had been variously changed, and have found that the occurrence of peaks thereof in the X-ray diffraction spectrum correlates with the shift of the light emission spectrum to short wavelength side. They also proved that this occurs when the Ga/Ca ratio in the luminescent layer is between 2.1 and 3.5. The occurrence of these peaks suggests that the crystal structure changes owing to the introduction of excess amounts of Ga. It is considered that the ligand field surrounding the luminescent center element is perturbed as a result of this change in the crystal structure and that this perturbation gives rise to a slight shift to shorter wavelength in the light emission spectrum.

The concentration of the Ce incorporated as the luminescent center element with respect to the total atomic number of Ca, Ga and Ce is preferably between 0.2 at. % and 3.0 at. % and even more preferably between 0.4 at. % and 1.0 at. % High light emission intensity can be obtained when the Ce is within this range. This is because, while intensity decreases as a result of a reduction in the luminescent center upon reduction of the Ce concentration within the luminescent layer, intensity also decreases due to concentration quenching upon an increase in the Ce concentration.

Further, the following structure is permissible in order to further increase light emission intensity. Specifically, in the EL element a semiconductor thin-film layer is interposed between any one of the first and second insulating layers and the luminescent layer, the semiconductor thin-film layer being a transparent material where it is interposed on the light emission side. When the EL element is constructed in this way, electrons are accelerated in this semiconductor thin-film layer and by injecting these high-speed electrons into the luminescent layer, the light emission intensity of the luminescent layer is increased.

Additionally, according to the material of the first insulating layer, it may be better to interpose the semiconductor thin-film layer only between the second insulating layer and the luminescent layer. This is because there are cases where the semiconductor thin-film layer easily peels off from the first insulating layer during formation of the luminescent layer.

SrS (strontium sulphide) or ZnS (zinc sulphide) may be given as examples of the semiconductor thin-film layer. SrS has a large band gap with respect to calcium thiogallate and it is more suitable for injection of high-speed electrons.

Note that in such EL elements the layer thickness of the luminescent layer is preferably 600 nm or less. This is because, as described later, when performing thermal treatment during formation of the luminescent layer, a large amount of peeling is generated due to the distribution of stress within the film where the film thickness is made thicker than this.

On the other hand, the fabrication method of the EL element of the present invention includes laminating a first electrode, a first insulating layer, a luminescent layer, a second insulating layer and a second electrode on a substrate in that order, the EL element being transparent from at least the luminescent layer in the light emitting direction, wherein the luminescent layer is deposited by sputtering method using a sputtering gas of Ar or the like in which hydrogen sulphide of between 5 mol % and 50 mol % is included and a target which has been fired after mixing $CaGa_2S_4$ to which a Ce compound has been added and a Ga compound.

Note that $Ga_2O_3$, $Ga_2S_3$, $GaS$, $GaF_3$, etc. can be used as the Ga compound, and $Ce_2S_3$, $CeO_2$, $CeF_3$, $CeCl_3$, etc. can be used as the Ce compound.

Also, in the EL element fabrication method of the present invention, the hydrogen sulphide in the sputtering gas is preferably set at a partial pressure of between 0.05 Pa and 2 Pa. At less than 0.05 Pa, sulfur (S) becomes deficient in the luminescent layer and a light emissive film cannot be obtained. Conversely, at more than 2 Pa, plasma cannot be stably maintained during sputtering.

Further, in such fabrication methods of EL elements, the atomic composition ratio Ga/Ca of Ga to Ca in the target is set to be $2.2 \leq Ga/Ca \leq 2.8$, or more preferably $2.35 \leq Ga/Ca \leq 2.65$. By employing such a fabrication method, am EL element having a luminescent layer whose Ga/Ca ratio is from 2.1 to 3.5 can be fabricated.

Also, in the fabrication method of EL elements, the target may be prepared so as to be fired in a hydrogen sulphide atmosphere. Specifically, when fired in such an atmosphere, fluctuation of the composition ratio of the S in the $CaGa_2S_4$:Ce can be suppressed.

In this way, according to the present invention, it is possible to provide an EL element with high light emission intensity and good blue color purity, and which will hereafter have a great effect on the full color development of EL display devices.

Hereafter, the present invention will be explained based on specific embodiments.

[First Embodiment]

FIG. 1 is an exemplary diagram showing a cross section of a thin-film EL element 10 according to a first embodiment. Note that in the thin-film EL element 10 of FIG. 1, light emerges in the direction of the arrow.

The thin film EL element 10 of the embodiment is formed by laminating the following thin films in order on a glass substrate 11 which is an insulative substrate. Note that each film thickness of the following thin films are described using the central portions thereof as the standard.

On the glass substrate 11, a first transparent electrode 12 comprising optically transparent ZnO, a first insulating layer 13 comprising optically transparent $SrTiO_3$ (strontium titanate) thereon, a luminescent layer 14 comprising $CaGa_{2.9}S_{4.2}$ to which Ce is added as the luminescent center, a second insulating layer 15 comprising optically transparent $SrTiO_3$ and a second transparent electrode 16 comprising optically transparent ZnO are formed.

Next, the fabrication of the thin film EL element 10 will be described.

Firstly, the first transparent electrode 12 is deposited on the glass substrate 11. ZnO powder to which $Ga_2O_3$ (gallium oxide) is added and mixed and which is formed into a pellet shape is used as the evaporation material and an ion plating apparatus is used as the deposition apparatus. Specifically, the ion plating apparatus is exhausted to create a vacuum while the glass substrate 11 is maintained at a constant temperature. Thereafter, Ar (argon) gas is introduced while pressure is maintained at a constant level, and beam electrical power and high frequency electrical power are adjusted so that the deposition rate is kept within a range of 6 to 18 nm/min.

Next, the first insulating layer 13 comprising $SrTiO_3$ is formed on the first transparent electrode 12 by a sputtering method. Specifically, a gas mixture of Ar and $O_2$ (oxygen) is introduced into the sputtering apparatus while maintaining the glass substrate 11 at a constant temperature and deposition is performed with 200W high frequency electrical power.

Subsequently, the luminescent layer 14 comprising $CaGa_{2.9}S_{4.2}$ to which Ce as the luminescent center is added is formed on the first insulating layer 13 by a sputtering method. Here, the description of $CaGa_{2.9}S_{4.2}$ indicates a composition wherein the Ga/Ca ratio of the luminescent layer 14 is 2.9. The S/Ca ratio is a value normally in the order of 4.1 to 5.2, which value is irrelevant to the light emission characteristic of the luminescent layer. In this embodiment, the target used was a mixture of $CaGa_2S_4$ and $Ga_2O_3$ fired in a hydrogen sulphide atmosphere, the Ga/Ca ratio in the target thus obtained being 2.5. Although Ce was added in the form of $Ce_2S_3$, the method for adding Ce may not be confined to this but may also be in the form of $CeO_2$, $CeF_3$, $CeCl_3$, etc. The composition of the luminescent layer and target can be measured by an electron probe X-ray micro-analyzer. Sputtering was performed using Ar gas including 20 mol % of hydrogen sulphide, and sputtering pressure was set so that the partial pressure of the hydrogen sulphide was 0.2 Pa, the partial pressure of the hydrogen sulphide preferably being within a range of from 0.05 to 1 Pa. The substrate temperature was maintained at 300° C. After forming the luminescent layer 14 by the sputtering method, thermal treatment is preferably performed. In the embodiment, thermal treatment for 5 minutes in an $Ar+H_2S$ atmosphere at 650° C, the temperature rise rate from 600° C. to 650° C. being 10° C. per minute and $H_2S$ density being 20 mol %, was performed. The luminescent layer 14, which does not exhibit light emission immediately after formation, exhibits light emission due to this thermal treatment. The Ce concentration within the luminescent layer 14 was 0.5 at.% with respect to the total atomic number of the Ca, Ga and Ce.

Next, on the luminescent layer 14, the second insulating layer 15 comprising $SrTiO_3$ is formed by the same method as the first insulating layer 13 described above. Finally, the second transparent electrode 16 comprising ZnO is formed on the second insulating layer 15 by the same method as the first transparent electrode 12 described above.

Thin film thicknesses of these layers are 300 nm for the first and second transparent electrodes 12 and 16, 500 nm for the first and second insulation layers 13 and 15, and 500 nm for the luminescent layer 14.

Figure 2:
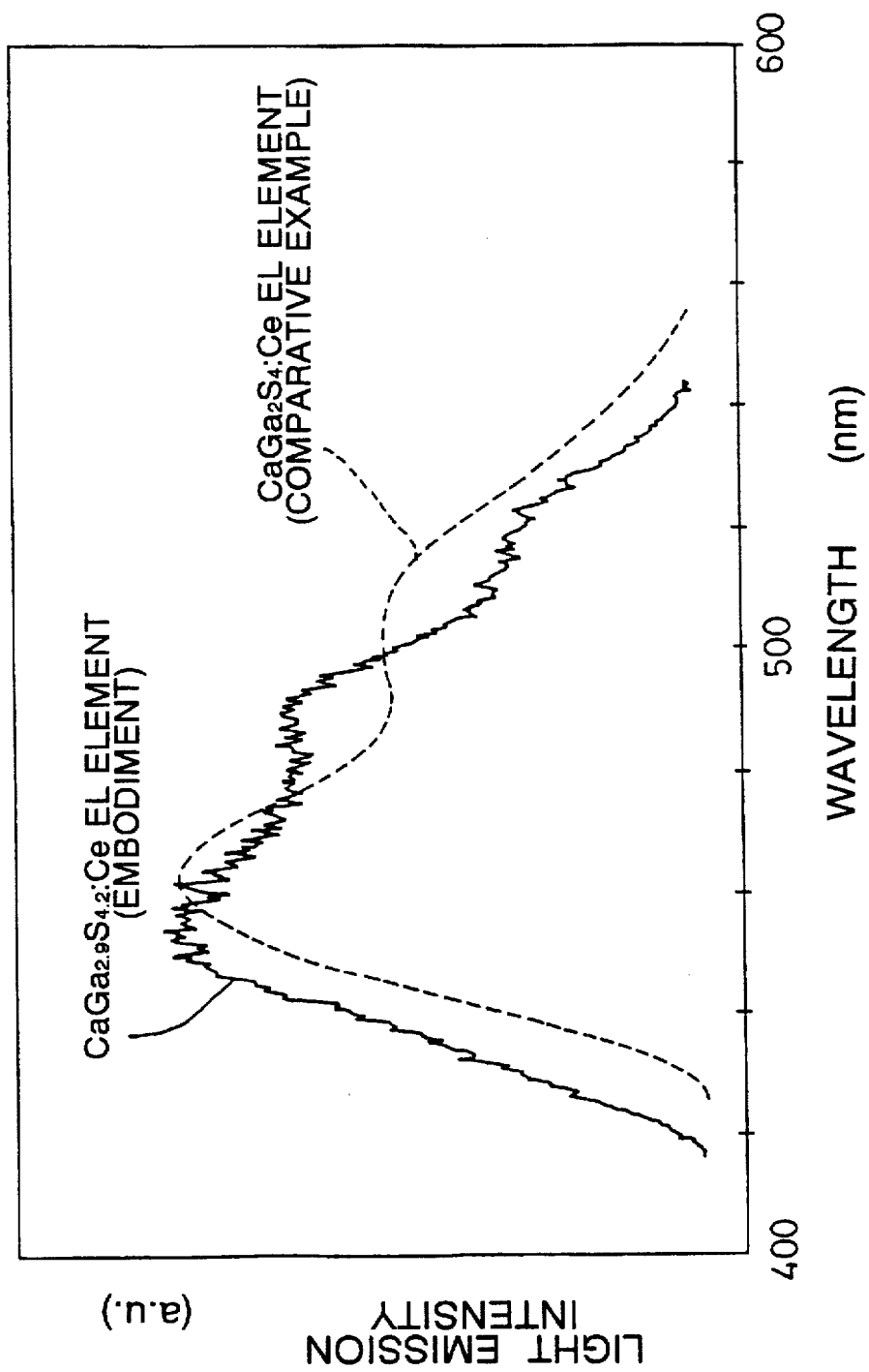
FIG. 2 is a graph of the EL light emission spectrum of the EL element according to the first embodiment.

An actual EL element was fabricated using the above method, and the light emission spectrum thereof was investigated. The light emission spectrum of the EL element is shown in FIG. 2. Note that in FIG. 2, for the purpose of comparison, the light emission spectrum of an EL element using a $CaGa_2S_4$:Ce luminescent layer is represented by a broken line.

The occurrence of vibration structures in the spectrum are due to an interference effect in the thin layers. As can be better understood from FIG. 2, the light emission spectrum of the thin film EL element 10 according to the embodiment shifts toward the shorter wavelength side than that of the EL element which has $CaGa_2S_4$:Ce as the luminescent layer. As a result, blue color purity is improved by the thin film EL element 10 of the embodiment; specifically, the CIE coordinates are of X=0.15 and y=0.16.

Figure 3:
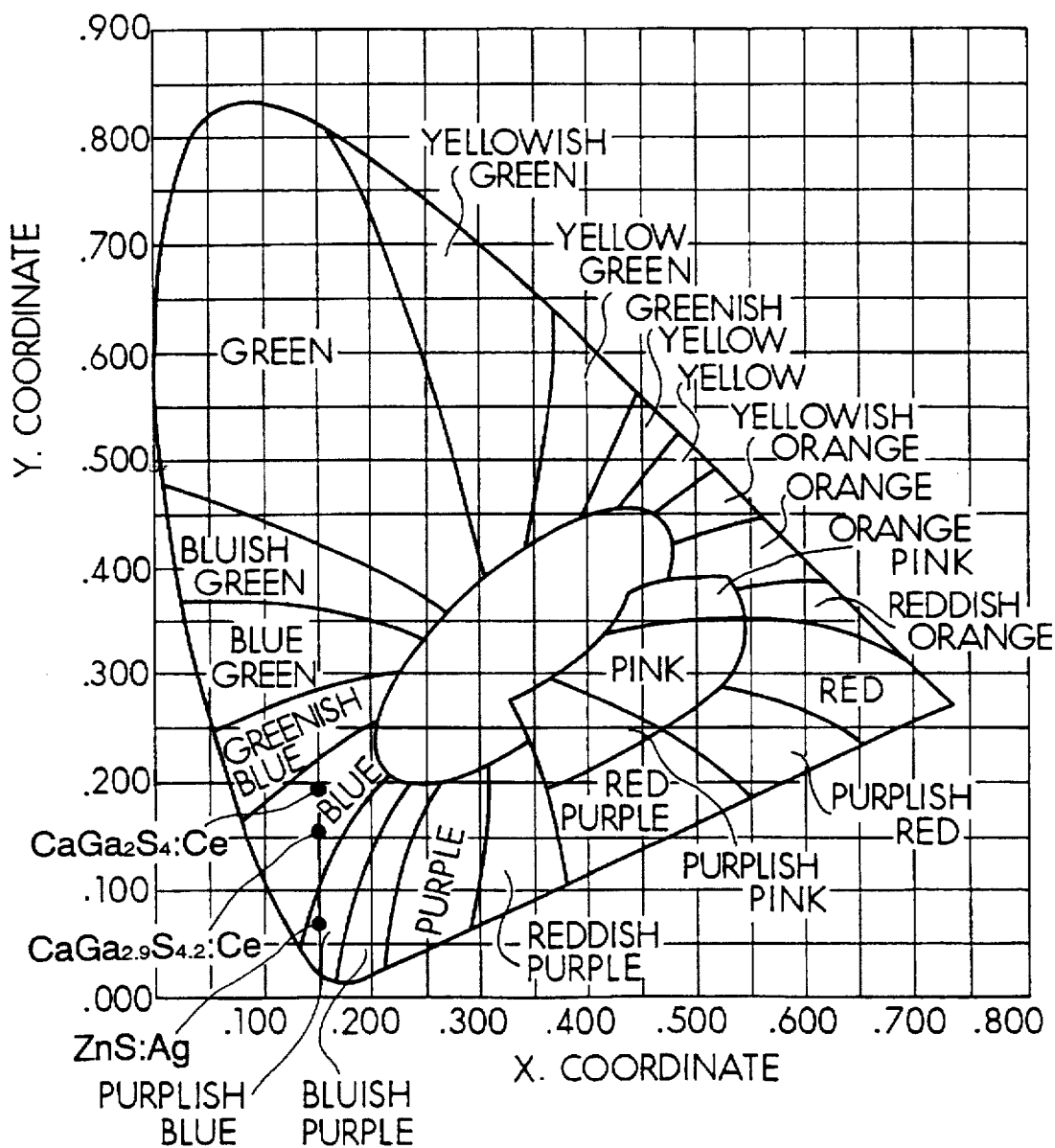
FIG. 3 is CIE coordinate color graph showing CIE color coordinates of the EL element according to the first embodiment.

Plotting these coordinates on the CIE coordinate color chart, they are as shown in FIG. 3. In FIG. 3, the CIE color coordinates of a $CaGa_2S_4$:Ce luminescent layer as a comparative example and the CIE color coordinates of ZnS:Ag used as the blue phosphor of a cathode ray tube are plotted together. It can be understood from FIG. 3 that the luminescent layer 14 of the thin film EL element 10 of the embodiment is closer to the blue color purity of the blue phosphor of the cathode ray tube.

By changing the Ga/Ca ratio in the sputter target, the Ga/Ca ratio in the luminescent layer 14 can be changed.

As has already been described, when the Ga/Ca ratio in the luminescent layer is 2, the CIE color coordinates are x=0.15, y=0.19. In contrast to this, the CIE color coordinates when the Ga/Ca ratio in the luminescent layer is 3.5 are x=0.15, y=0.15. Where the Ga/Ca ratio is changed from 2 to 3.5 in this way, only the y coordinate of the CIE color coordinates is changed without changing the x coordinate. A decrease in the y coordinate corresponds to improvement of the blue color purity.

Figure 4:
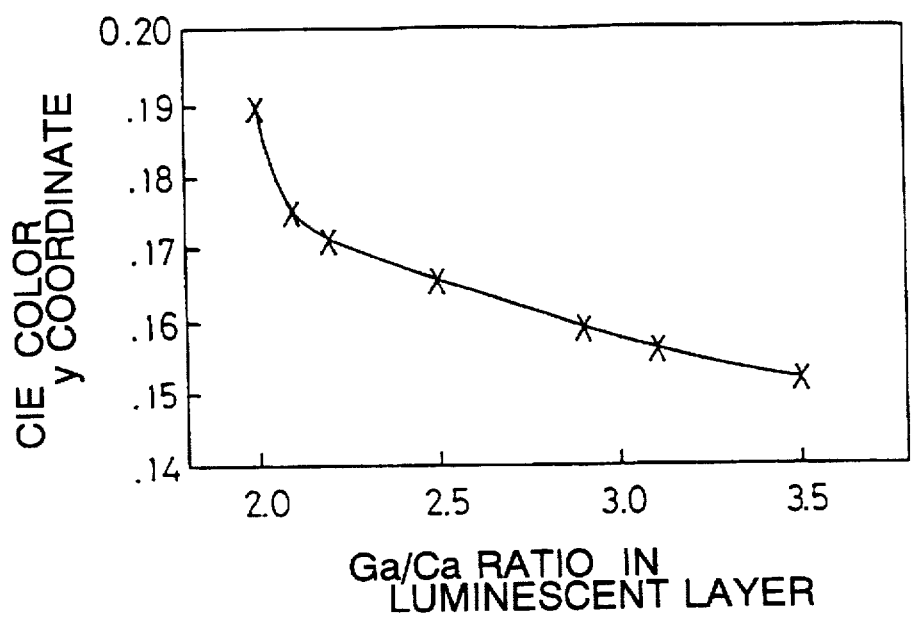
FIG. 4 is a graph showing changes in the y coordinate of CIE color coordinates of the EL element according to the first embodiment when the Ga/Ca ratio in the luminescent layer thereof is changed.

FIG. 4 shows changes in the y coordinate when the Ga/Ca ratio in the luminescent layer is changed from 2 to 3.5. As can be understood from this graph, a significant change can already be seen when the Ga/Ca ratio is 2.1. The color essentially stabilizes when the Ga/Ca ratio is 2.4 or more. Note that once the Ga/Ca ratio exceeds 3.5, a large number of voids appear in the luminescent layer, and in fact when operated the luminescent layer is very easily damaged and therefore is not practically applicable.

From the above, it can be said that the Ga/Ca ratio in the luminescent layer is preferably within the range of 2.1 to 3.5, and more particularly within the range of 2.4 to 3.5. On the other hand, in the case of $SrGa_2S_4$:Ce in Japanese Unexamined Patent Publication No. H2-72592, it is clear that, if the Ga/Sr ratio deviates greatly from 2, light emission intensity declines sharply. In the present embodiment, however, a significant reduction in light emission intensity could not be seen in the range of $2.1 \leq x \leq 3.5$ with respect to the composition $CaGa_xS_y$:Ce.

Figure 5:
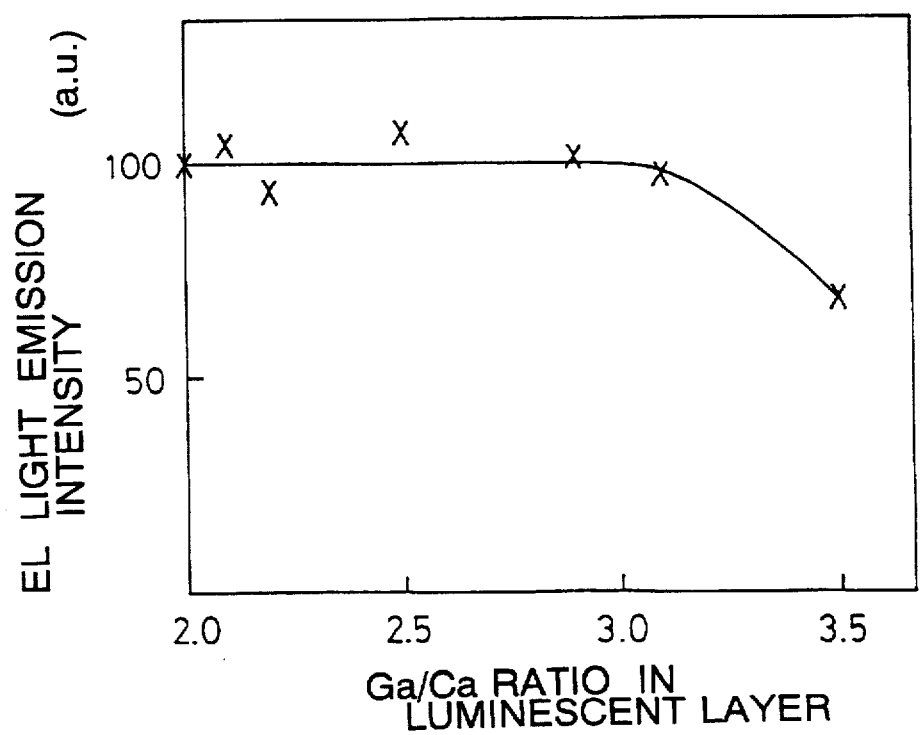
FIG. 5 is a graph showing changes in the EL light emission intensity when the Ga/Ca ratio in the luminescent layer of the EL element of the first embodiment is changed.

FIG. 5 shows EL light emission intensity with respect to various Ga/Ca ratios within the luminescent layer under the same conditions. As can be understood from the graph, a significant reduction in light emission intensity cannot be seen in a range of $x \leq 3.5$, in particular, light emission intensity does not substantially change in a range of $x \leq 3.1$. In this way, the luminescent layer of the present embodiment differs from $SrGa_2S_4$:Ce and $CaGa_xS_y$: Ce does not incur light emission intensity reduction even where Ga exists in excess.

From the above, it can be said the condition that satisfies high blue color purity and high light intensity is the range of $2.4 \leq x \leq 3.1$.

Figure 6:
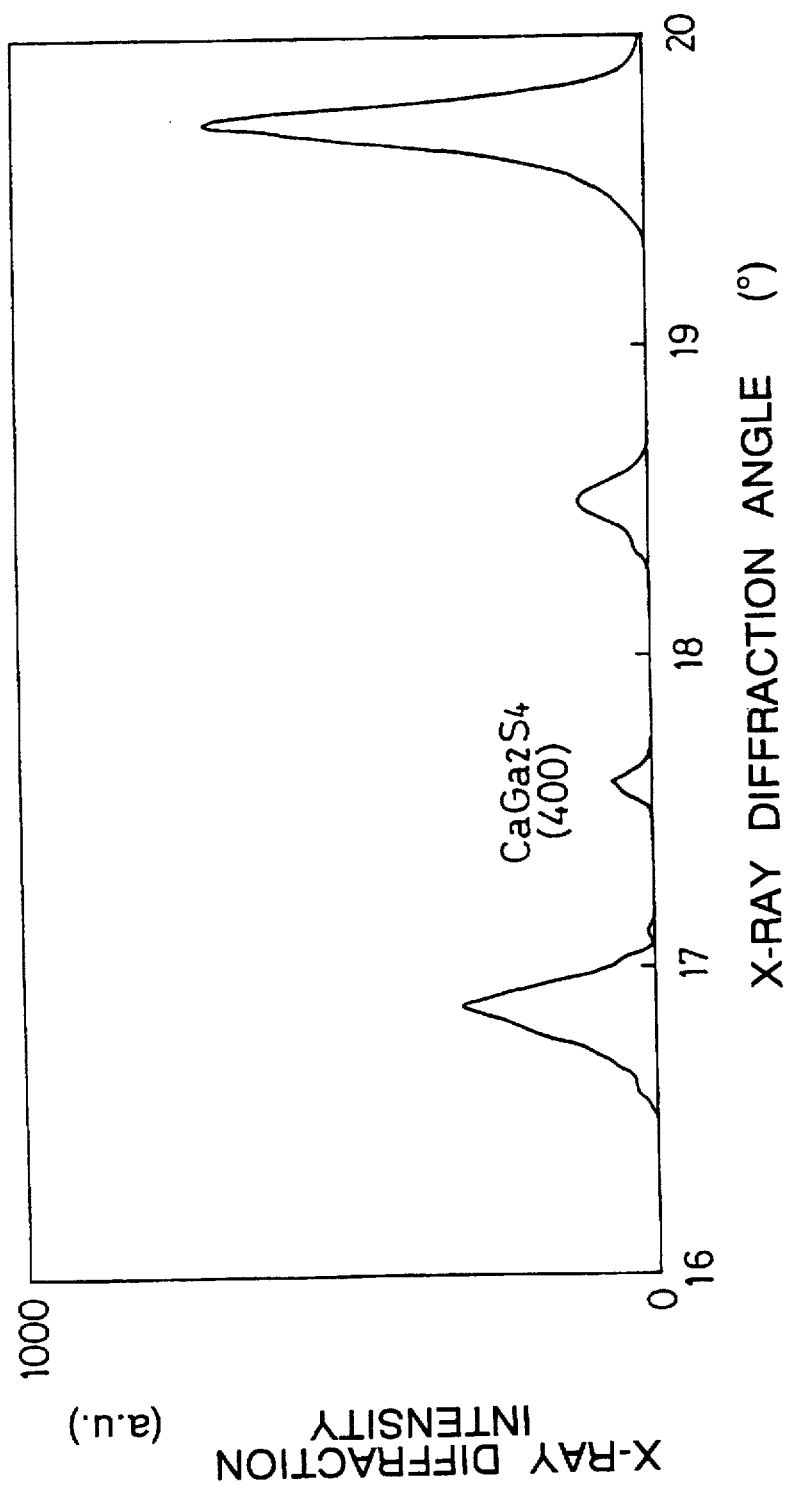
FIG. 6 is a graph of the X-ray diffraction spectrum of the luminescent layer of the EL element of the first embodiment.

Next, the X-ray diffraction spectrum after thermal treatment of the luminescent layer 14 of the embodiment is shown in FIG. 6. This is the spectrum when a Kα characteristic X-ray of Cu is used as the X-ray source. This spectrum differs from that of $CaGa_2S_4$. Specifically, although the $CaGa_2S_4$ (400) diffraction peak at a X-ray diffraction of 17.6° should exist according to the $CaGa_2S_4$ X-ray diffraction peak data described in the JCPDS (Joint Committee on Powder Diffraction Standards) Card No. 25-0134, in the luminescent layer 14 of the present invention, the peak appearing at 17.6° is extremely small, or rather the peaks appear at 16.9°, 18.5° and 19.7°. The inventors of the present invention, upon investigating luminescent layers of various structures, drew a complete correlation between the occurrence of these peaks in the X-ray diffraction spectrum and the short wavelength side shift of the light emission spectrum. In addition, they also proved that this occurred when the Ga/Ca composition ratio in the luminescent layer was between 2.1 and 3.5. The occurrence of these peaks suggests that the crystal structure changes owing to the introduction of excess amounts of Ga. It can be considered that the ligand field surrounding the luminescent center element is perturbed due to this change in the crystal structure and that this perturbation gives rise to a slight shift to shorter wavelength in the light emission spectrum.

Figure 7:
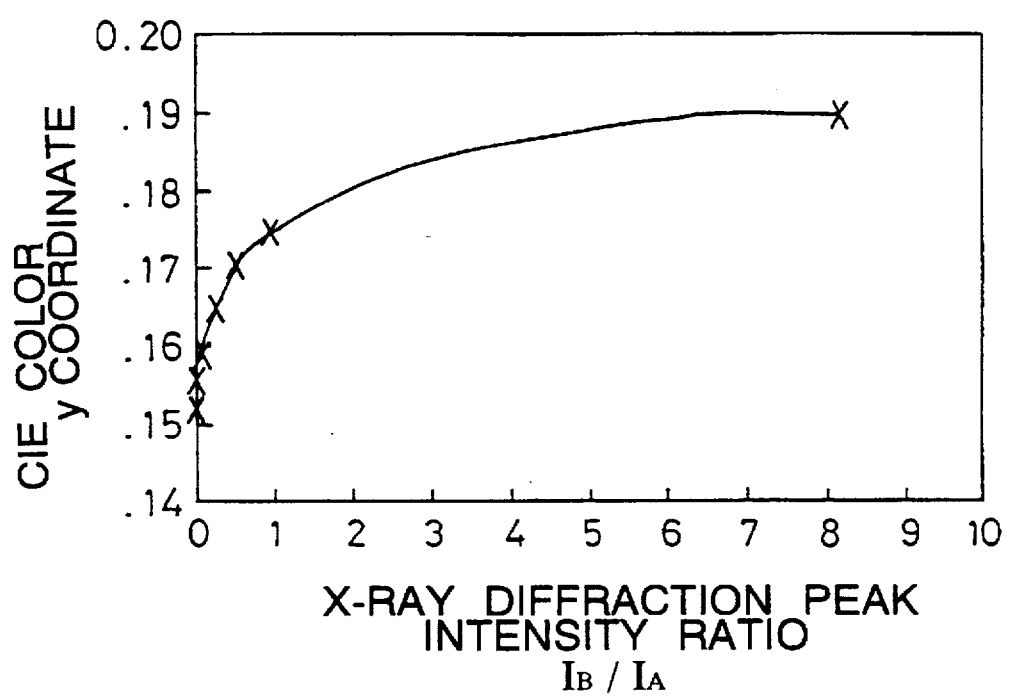
FIG. 7 is a graph showing the interdependence of the CIE color y coordinate of the emitted EL light of the first embodiment and the ratio $I_B/I_A$ of the luminescent layer of the EL element of the first embodiment, wherein $I_B$ is an X-ray diffraction peak strength of $CaGa_2S_4$ (400) plane and $I_A$ is an X-ray diffraction peak strength at diffraction angle of 19.7°.

As shown in FIG. 6, among the three X-ray diffraction peaks which can be seen at the X-ray diffraction angles 16.9°, 18.5° and 19.7° in the luminescent layer 14 of the present invention, the largest peak strength is at the 19.7° peak. Specifically, the degree of short wavelength side shift of the light emission spectrum can be related to the above peak strength. FIG. 7 shows changes in the CIE color y coordinate of the EL emission when the ratio $I_B/I_A$ of an X-ray diffraction peak strength $I_B$ appearing at 17.6°, i.e., $CaGa_2S_4$ (400) plane X-ray diffraction peak strength, with respect to an X-ray diffraction peak strength $I_A$ appearing at 19.7° changes. From FIG. 7, a significant change in the y coordinate can be seen when the ratio $I_B/I_A$ is 1 or less. Here, $I_B/I_A=0$ data means that a $CaGa_2S_4$ (400) plane X-ray diffraction peak does not appear. Further, from FIG. 7 and FIG. 4, it can be understood that, in making the peak strength ratio $I_B/I_A$ 1 or less, the Ga/Ca composition ratio in the luminescent layer may be 2.1 to 3.5.

Figure 8:
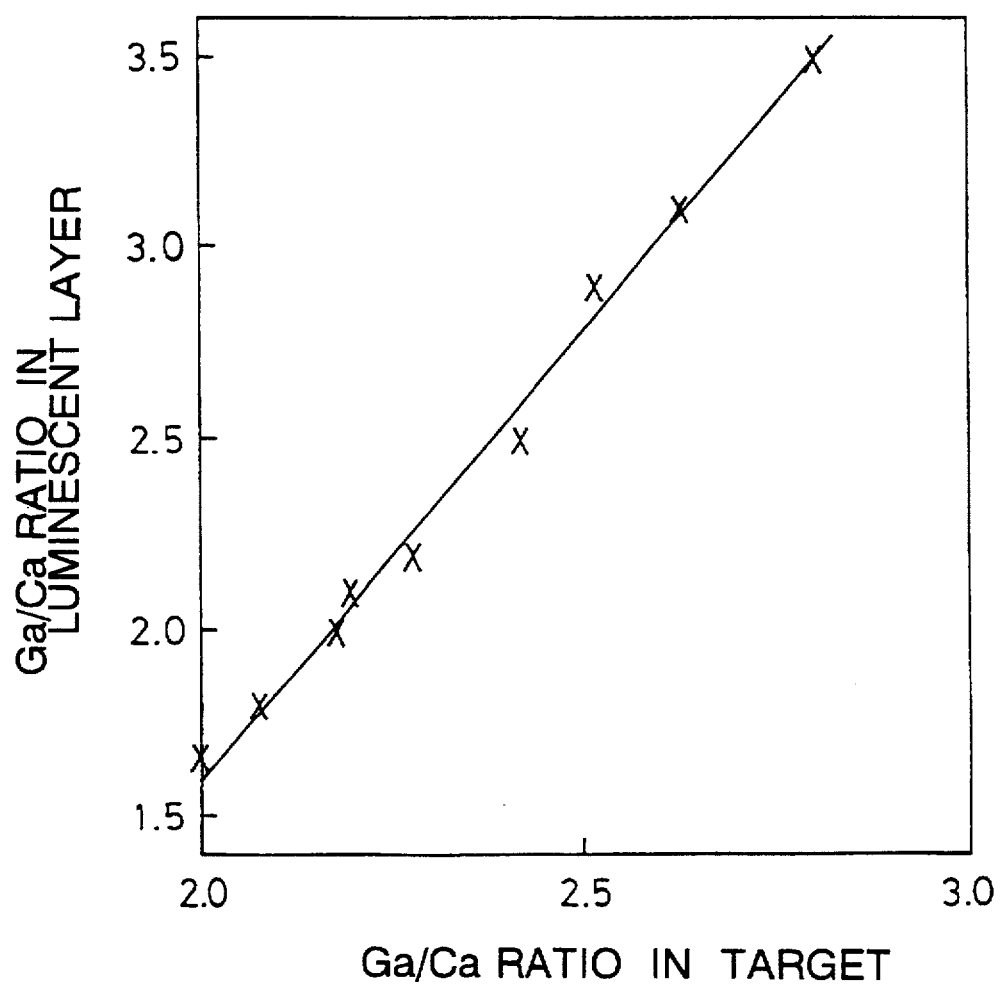
FIG. 8 is a graph showing the relationship between a Ga/Ca ratio in a sputtering target and a Ga/Ca ratio in a luminescent layer.

FIG. 8 shows the correlation between Ga/Ca ratio (atomic ratio) in the sputtering target and the Ga/Ca ratio in the luminescent layer 14 formed using this. In realizing $CaGa_x$-$S_y$:Ce where $2.1 \leq x \leq 3.5$, the target Ga/Ca ratio may be made $2.2 \leq Ga/Ca \leq 2.8$. In realizing the more preferable $CaGa_xS_y$:Ce where $2.4 \leq x \leq 3.1$, the target Ga/Ca ratio may be made $2.35 \leq Ga/Ca \leq 2.65$.

Next, the experimental results regarding Ce concentration will be described. Generally, when the Ce concentration within the luminescent layer decreases, this gives rise to a decrease in the luminescent center and reduces light intensity. Conversely, when Ce concentration increases, light intensity decreases due to concentration quenching. As a result of this, there is a certain Ce concentration range at which high light intensity can be attained. In the embodiment, achievement of high intensity was confirmed when the Ce concentration was between 0.2 at. % and 3.0 at. %, or more preferably between 0.4 at. % and 1.0 at. % with respect to the total number of atoms of Ca, Ga and Ce.

Next, another luminescent layer fabrication method according to the present embodiment will be described. It is a method which maintains the substrate temperature at between 590° C. and 650° C. when forming the luminescent layer 14 by the sputtering method. The hydrogen sulphide partial pressure is preferably 0.2 to 2 Pa. Upon formation of the luminescent layer 14 by this method, the luminescent layer 14 exhibits light emission without being subjected to thermal treatment processing. However, light intensity is improved by performing heat treatment.

Yet another luminescent layer formation method according to the present embodiment is to use a co-sputtering system to obtain a predetermined Ga/Ca ratio. Specifically, it is a method of forming the luminescent layer by providing a target of $Ga_2S_3$ or $Ga_2O_3$ as well as the $CaGa_2S_4$ ($CaGa_2S_4$:Ce) target and simultaneously sputtering them in a hydrogen sulphide atmosphere.

By means of the present embodiment as described above, an EL element in which light intensity is high and blue color purity is better than in an EL element using a $CaGa_2S_4$:Ce luminescent layer can be provided.

[Second Embodiment]

Figure 9:
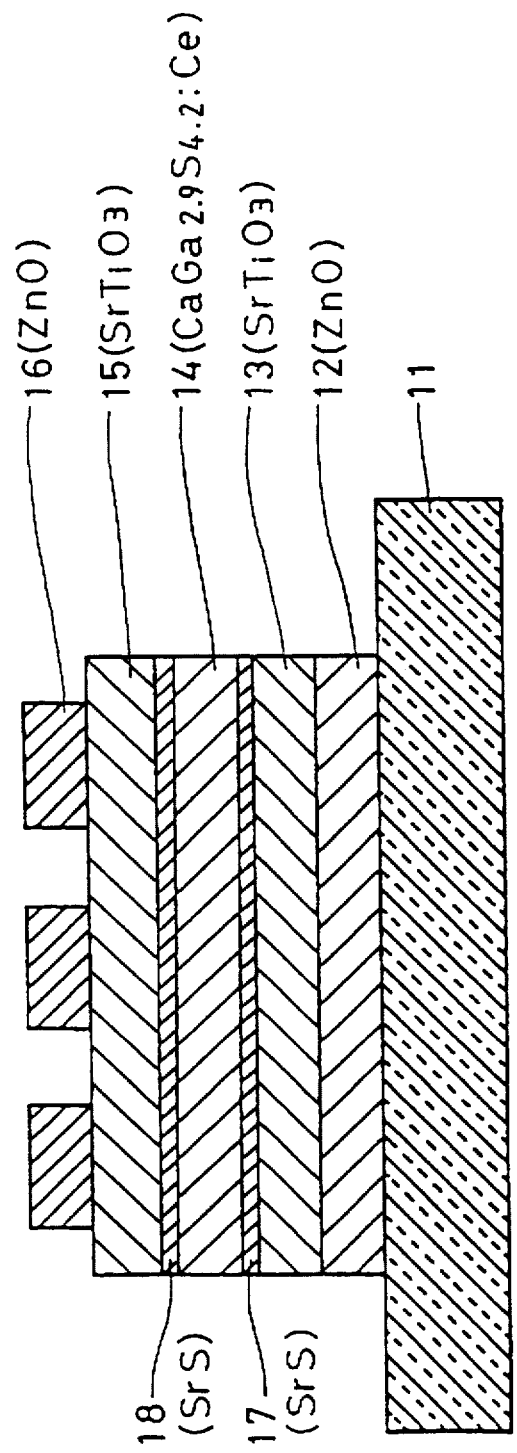
FIG. 9 is an exemplary diagram showing a vertical cross section of an EL element according to a second embodiment.

FIG. 9 is an exemplary drawing showing a cross section of a thin film EL element 20 according to a second embodiment. This thin film EL element 20 is formed by laminating, on a glass substrate 11 which is an insulating substrate, a first transparent electrode 12 of ZnO, a first insulating layer 13 of $SrTiO_3$, an SrS layer 17, a luminescent layer 14 comprising $CaGa_{2.9}S_{4.2}$ to which Ce is added as the luminescent center, an SrS layer 18, a second insulating layer 15 of $SrTiO_3$ and a second transparent electrode 16 of ZnO. In short, it differs from the first embodiment in that SrS layers 17 and 18 are interposed above and below the luminescent layer 14.

Layer formation of the layers other than the SrS layers 17 and 18 is the same as in the first embodiment. In the embodiment, the SrS layers 17 and 18 were formed by the MOCVD (metal-organic chemical vapor deposition) method with $Sr(C_{11}H_{19}O_2)_2$ (bisdipivaloylmethane strontium) and hydrogen sulphide as the source materials. The film thickness of the SrS layers 17 and 18 was 80 nm and the film thickness of the luminescent layer 14 was 400 nm.

The CIE coordinates of the fabricated EL element were x of 0.15 and y of 0.16. Also, the light emission intensity thereof was approximately 1.5 times higher compared to that of the first embodiment.

SrS has a larger band gap than $CaGa_2S_4$ and possibly a larger band gap than $CaGa_{2.9}S_{4.2}$. Therefore, it is thought that accelerated electrons within the SrS layers 17 and 18 become hot electrons and are injected into the luminescent layer 14, increasing excitation of the luminescent center and improving light intensity. Consequently, since it is important that electrons within the SrS layers 17 and 18 are, if possible, accelerated without energy loss, SrS layers with good crystallinity are necessary. Therefore, formation thereof by the MOCVD method, ALE (atomic layer epitaxial growth) method or the like is preferable.

The effect of improving light intensity can be attained by substituting ZnS layers for the SrS layers 17 and 18. Since the band gap of ZnS is smaller than that of SrS it is disadvantageous in injecting hot electrons, but it is thought that since the number of the electrons in the conduction band is large, ZnS can effectively perform the role of injecting hot electrons into the luminescent layer 14. The material forming these layers 17 and 18 may be any material so long as it is an optically transparent semiconductor on which a technique for growing a thin film with good crystallinity has been established.

[Third Embodiment]

Figure 10:
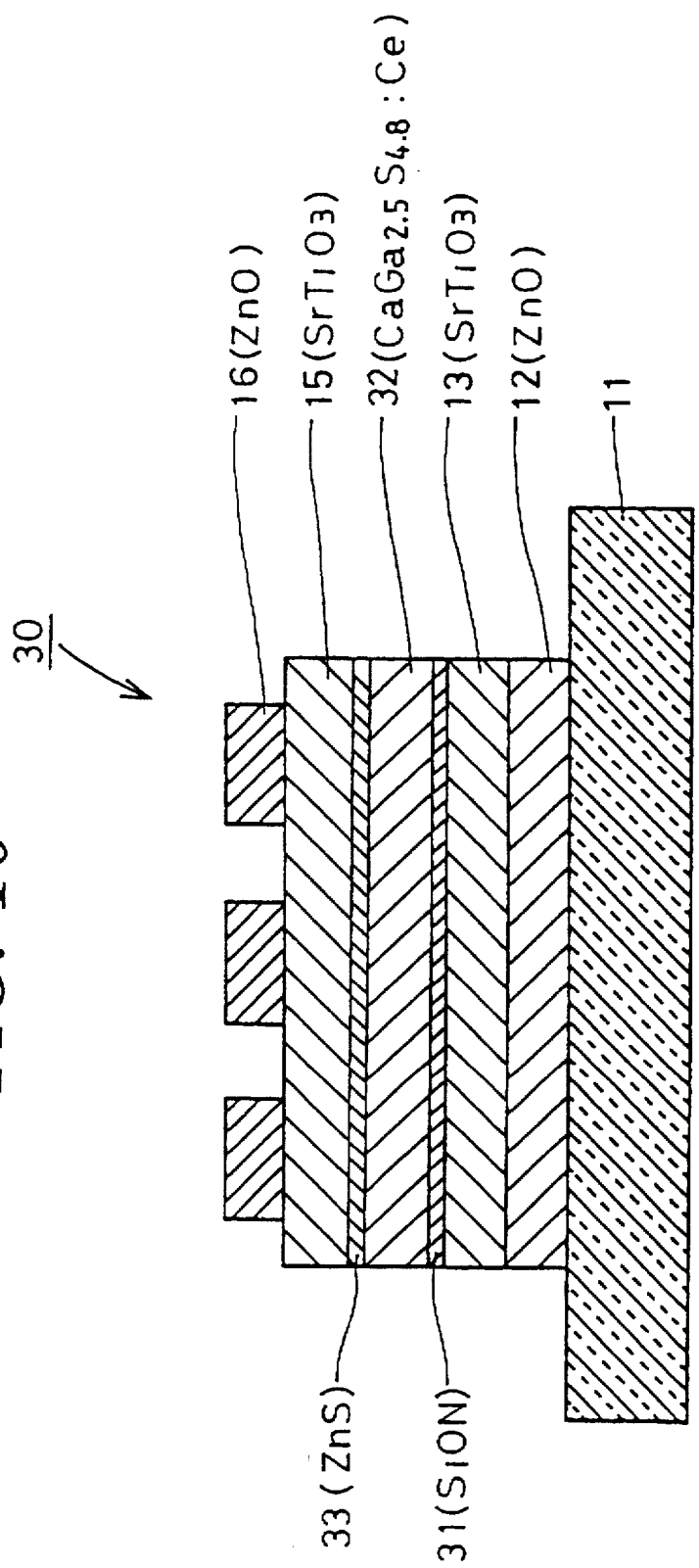
FIG. 10 is an exemplary diagram showing a vertical cross section of an EL element according to a third embodiment.

FIG. 10 is an exemplary diagram showing a cross section of an EL element 30 according to a third embodiment of the present invention. This EL element 30 is formed by laminating, on a glass substrate 11 which is an insulating substrate, a first electrode 12 of ZnO, a first insulating layer 13 of $SrTiO_3$, an SiON layer 31, a luminescent layer 32 comprising $CaGa_{2.5}S_{4.8}$ to which Ce is added, a ZnS layer 33, a second insulating layer 15 of $SrTiO_3$ and a second electrode 16 of ZnO.

The formation methods of the first electrode 12, the first insulating layer 13, the second insulating layer 15 and the second electrode 16 are the same as in the first embodiment.

The SiON layer 31 can be formed by sputtering method and the film thickness thereof is 50 nm. This thin layer has the effect of improvement in withstand voltage.

In the embodiment, the luminescent layer 32 was formed by MOCVD (metal-organic chemical vapor deposition) method with $Ca(C_{11}H_{19}O_2)_2$ (bisdipivaloylmethanate calcium), $Ga(C_2H_5)_3$ (triethylgallium) and hydrogen sulphide as the source materials of the host material, and $Ce(C_{11}H_{19}O_2)_3$ (tridipivaloylmethanate cerium) as the luminescent center source material. $Ca(C_{11}H_{19}O_2)_2$ was sublimated by heating to 220° C. and introduced into a reactor by circulating Ar carrier gas at the gas flow rate of 1,000 cc/min. Ga(C$_2$H$_5$)$_3$ was vaporized at a maintained temperature of 14° C. and introduced into the reactor by circulating. Ar carrier gas at the gas flow rate of 600 cc/min. The hydrogen sulphide was diluted with Ar and thereafter introduced into the reactor at the gas flow rate of 250 cc/min. Ce(C$_{11}$H$_{19}$O$_2$)$_3$ was sublimated by heating to 165° C. and introduced into the reactor by circulating Ar carrier gas at the gas flow rate of 400 cc/min.

The substrate temperature was maintained at 500° C. Herein, upon forming the ZnS layer on the SiON layer 31, since peeling of the ZnS layer was observed at such a substrate temperature, a structure is employed in which a ZnS layer is not interposed between the SiON layer 31 and the luminescent layer 32.

The film thickness of the luminescent layer 32 was 500 nm. The composition of the luminescent layer 32, upon analysis by an electron probe X-ray micro-analyzer, was CaGa$_{2.5}$S$_{4.8}$. When the MOCVD method is used, control of the Ga/Ca ratio in the luminescent layer 32 is comparatively good, and can be controlled, for example, by changing the maintained temperature of the Ga(C$_2$H$_5$)$_3$.

The ZnS layer 33 was formed by the MOCVD method with Zn(C$_2$H$_5$)$_2$ (diethylzinc) and hydrogen sulphide as the source materials. Since MOCVD growth of ZnS is a well-known technique, a detailed description thereof will not be given. The film thickness of the ZnS layer 33 was 100 nm.

At the substrate temperature of 500° C., the luminescent layer 32 is an amorphous and does not exhibit light emission. Here, similarly to the first embodiment, the luminescent layer 32 exhibits light emission after being subjected to heat treatment for 5 minutes in an Ar+H$_2$S atmosphere at 630° C.

Figure 11:
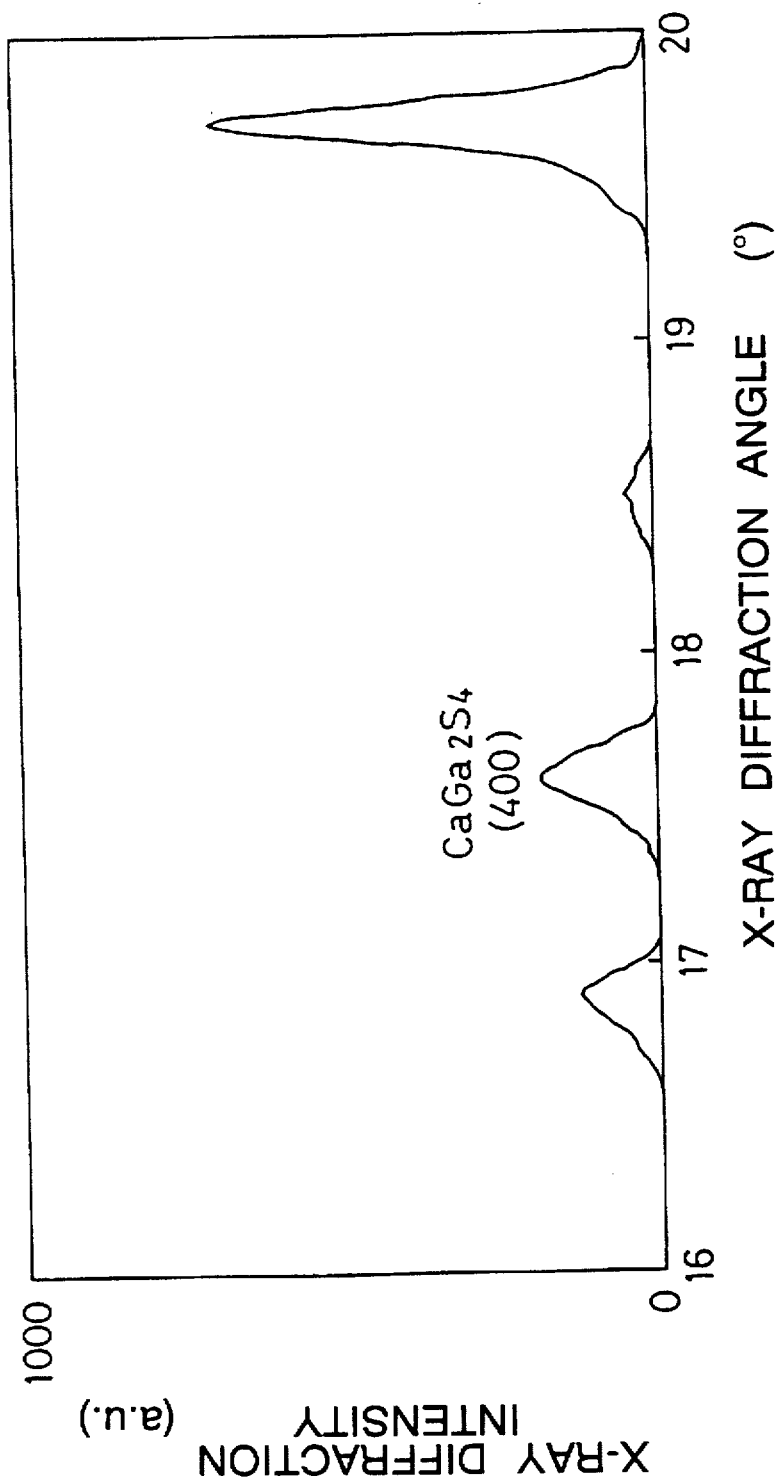
FIG. 11 is a graph of the X-ray diffraction spectrum of the EL element according to the third embodiment.
Figure 12:
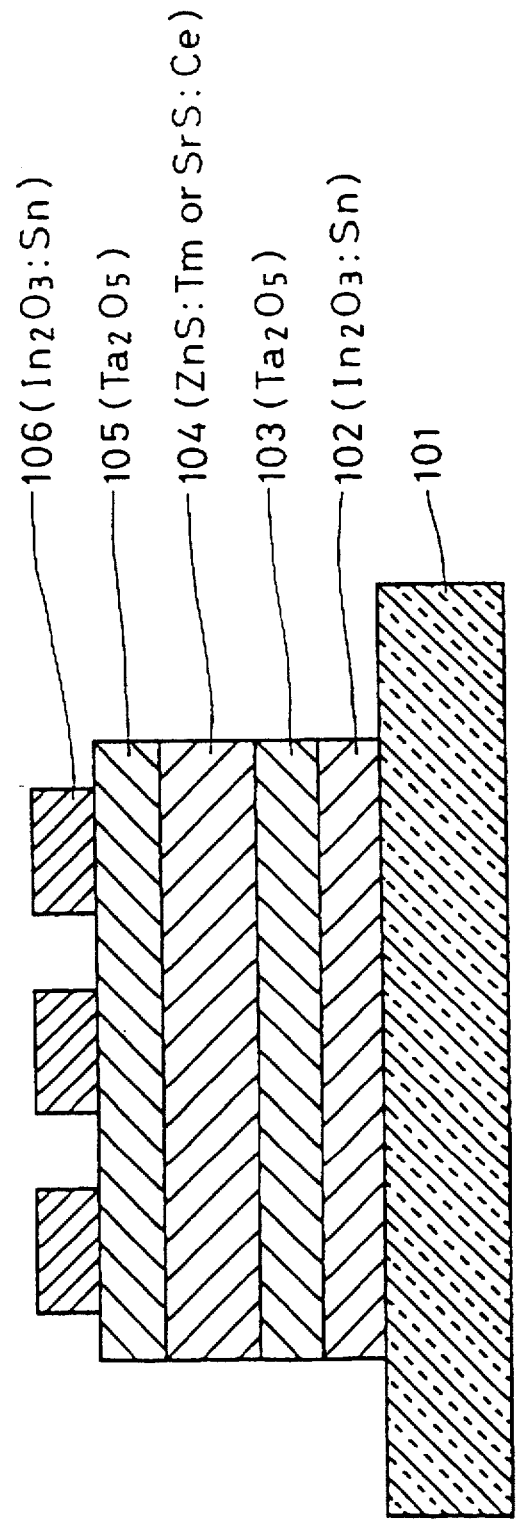
FIG. 12 is an exemplary diagram showing a vertical cross section of a conventional EL element.

The X-ray diffraction spectrum of the luminescent layer 32 formed in this manner is shown in FIG. 11. The ratio $I_B/I_A$ of the CaGa$_2$S$_4$ (400) plane X-ray diffraction peak strength $I_B$ with respect to the X-ray diffraction peak strength $I_A$ at 19.7° was 0.3. Also, the CIE color coordinates of the actually fabricated EL element were x of 0.15, y of 0.165, exhibiting better blue color purity than conventional CaGa$_2$S$_4$:Ce.

In the above description, the expression "Ga/Ca ratio" means the ratio of the number of Ga atom to the number of Ca atom.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An electroluminescence element comprising:
   a substrate;
   a first electrode deposited on said substrate;
   a first insulating layer deposited on said first electrode;
   a luminescent layer deposited on said first insulating layer, said luminescent layer having a chemical formula CaGa$_x$S$_y$ (where 2.1≦x≦3.5 and Y≧4), being doped with Ce as a luminescent center, and being formed from a target in which CaGa$_2$S$_4$ having a Ce-containing compound added thereto is mixed with a Ga-containing compound;
   a second insulating layer deposited on said luminescent layer; and
   a second electrode deposited on said second insulating layer.

2. An electroluminescence element according to claim 1, wherein x is in a range of 2.4≦x≦3.1.

3. An electroluminescence element according to claim 1, wherein an X-ray diffraction spectrum of said luminescent layer which uses Kα characteristic X-rays of copper as an X-ray light source has a peak at 19.7±0.2°.

4. An electroluminescence element according to claim 3, wherein a ratio $I_B/I_A$ of a CaGa$_2$S$_4$ (400) plane X-ray diffraction peak strength $I_B$ to a 19.7±0.2° X-ray diffraction peak strength $I_A$ appearing in said X-ray diffraction spectrum of said luminescent layer is in a range of 1 or less, said range including a case where a CaGa$_2$S$_4$ (400) plane X-ray diffraction peak does not exist.

5. An electroluminescence element according to claim 1, wherein a concentration of Ce in said luminescent layer is between 0.2% by atomic and 3.0% by atomic with respect to a total number of Ca, Ga and Ce atoms.

6. An electroluminescence element according to claim 1, further comprising a semiconductor thin-film layer interposed between at least any one of said first and second insulating layers and said luminescent layer, said semiconductor thin-film layer being formed from a transparent material in a case where said semiconductor thin-film layer is located at a light emission side of said luminescent layer.

7. An electroluminescence element according to claim 6, wherein said semiconductor thin-film layer is interposed only between said second insulating layer and said luminescent layer.

8. An electroluminescence element according to claim 6, wherein a material constituting said semiconductor thin-film layer is SrS or ZnS.

9. An electroluminescence element according to claim 1, wherein a film thickness of said luminescent layer is 600 nm or less.

10. An electroluminescence element comprising:
    a substrate;
    a first electrode deposited on said substrate;
    a first insulating layer deposited on said first electrode;
    a luminescent layer deposited on said first insulating layer, said luminescent layer having a structure in which Ce is added to a material in which Ca, Ga and S are host elements, said luminescent layer having a chemical formula CaGa$_x$S$_y$ (where 2.1≦x≦3.5 and Y≧4) and being formed from a target in which CaGa$_2$S$_4$ having a Ce-containing compound added thereto is mixed with a Ga-containing compound, an X-ray diffraction spectrum of said luminescent layer which uses Kα characteristic X-rays of copper as an X-ray light source having a peak at at least one of 16.9°±0.2°, 18.5°±0.2° and 19.7°±0.2°;
    a second insulating layer deposited on said luminescent layer; and
    a second electrode deposited on said second insulating layer.

11. An electroluminescence element according to claim 10, wherein a ratio $I_B/I_A$ of a CaGa$_2$S$_4$ (400) plane X-ray diffraction peak strength $I_B$ to a 19.7°±0.2° X-ray diffraction peak strength $I_A$ appearing in said X-ray diffraction spectrum of said luminescent layer is in a range of from 1 or less, said range including a case where a CaGa$_2$S$_4$ (400) plane X-ray diffraction peak does not exist.

12. An electroluminescence element according to claim 10, wherein a concentration of Ce in said luminescent layer is between 0.2% by atomic and 3.0% by atomic with respect to a total number of Ca, Ga and Ce atoms.

13. An electroluminescence element according to claim 10, further comprising a semiconductor thin-film layer interposed between at least any one of said first and second insulating layers and said luminescent layer, said semiconductor thin-film layer being formed from a transparent material in a case where said semiconductor thin-film layer is located at a light emission side of said luminescent layer.

14. An electroluminescence element according to claim 13, wherein said semiconductor thin-film layer is interposed only between said second insulating layer and said luminescent layer.

15. An electroluminescence element according to claim 13, wherein a material constituting said semiconductor thin-film layer is SrS or ZnS.

16. An electroluminescence element according to claim 10, wherein a film thickness of said luminescent layer is 600 nm or less.

17. An electroluminescence element comprising:

a substrate;

a first electrode deposited on said substrate;

a first insulating layer deposited on said first electrode;

a luminescent layer deposited on said first insulating layer, said luminescent layer having a chemical formula $CaGa_xS_y$ (where $2.1 \leq x \leq 3.5$ and $Y \geq 4$), being doped with Ce as a luminescent center, and being formed by a chemical vapor deposition technique in which bis-dipivaloylmethanate calcium, organic cerium, and organic gallium are selected as source materials;

a second insulating layer deposited on said luminescent layer; and a second electrode deposited on said second insulating layer.

* * * * *